United States Patent [19]
Drobny et al.

[11] Patent Number: 5,023,468
[45] Date of Patent: Jun. 11, 1991

[54] SAFETY DEVICE FOR CAR PASSENGERS

[75] Inventors: Wolfgang Drobny, Besigheim; Werner Nitschke, Ditzingen; Peter Taufer, Renningen; Hugo Weller, Oberriexingen, all of Fed. Rep. of Germany

[73] Assignee: Robert Bosch GmbH, Stuttgart, Fed. Rep. of Germany

[21] Appl. No.: 314,579

[22] PCT Filed: Jul. 15, 1987

[86] PCT No.: PCT/DE87/00320
§ 371 Date: Jan. 25, 1989
§ 102(e) Date: Jan. 25, 1989

[87] PCT Pub. No.: WO88/00896
PCT Pub. Date: Feb. 11, 1988

[30] Foreign Application Priority Data
Aug. 6, 1986 [DE] Fed. Rep. of Germany ....... 3626601

[51] Int. Cl.⁵ .............................. G60Q 9/00; H02J 7/00
[52] U.S. Cl. ...................................... 307/10.1; 307/63; 307/66; 307/120; 307/64; 340/436

[58] Field of Search .................... 307/10.1, 64, 65, 66, 307/86, 116, 120; 340/436, 440

[56] References Cited
U.S. PATENT DOCUMENTS

| | | | |
|---|---|---|---|
| 4,528,459 | 7/1985 | Wiegel | 307/66 |
| 4,638,175 | 1/1987 | Bradford et al. | 307/64 |
| 4,717,904 | 1/1988 | Murakami | 340/436 |
| 4,836,024 | 6/1989 | Woehrl et al. | 307/10.1 X |

FOREIGN PATENT DOCUMENTS

| | | |
|---|---|---|
| 2309111 | 9/1973 | Fed. Rep. of Germany . |
| 2143787 | 6/1972 | France . |
| 2267221 | 4/1975 | France . |

*Primary Examiner*—Derek S. Jennings
*Attorney, Agent, or Firm*—Michael J. Striker

[57] ABSTRACT

A safety device for a vehicle occupant comprising a restraint for the vehicle occupant, a sensing circuit for evaluating a vehicle condition, a control circuit for actuating the restraint in response to a predetermined vehicle condition, and two separate reserve energy storages for supplying electrical energy to the sensing and control circuits, respectively.

4 Claims, 1 Drawing Sheet

SAFETY DEVICE FOR CAR PASSENGERS

BACKGROUND OF THE INVENTION

The invention relates to a safety device for vehicle passengers comprising retaining means, a reserve energy storage and a control circuit for actuating the retaining means in response to a sensing condition of the vehicle. In a safety device of this type known from the US-PS 3,870,894 a capacitor, which is charged upon switching on of the current supply circuit, serves as a reserve energy storage. The reserve energy storage is intended to ensure that the operability of the safety device can be ensured at least for an additional period of time also during loss of the operating voltage. A disadvantage consists in that the capacitor which is used as the reserve energy storage can always only be charged to the actual voltage level of the current supply circuit. Therefore, under particularly unfavorable operating conditions, e.g. excessive loading of the in-vehicle voltage supply system, it may happen that the reserve energy storage is only charged to a voltage level which is no longer sufficient for a reliable operation of the safety device.

SUMMARY OF THE INVENTION

The object of the invention is a device in which a sufficient voltage is always available in the reserve energy storage also under operating conditions which are not optimum, particularly during a sharp drop in voltage in the in-vehicle voltage supply system, so that retaining means which are provided for the protection of the vehicle passengers can be actuated in a reliable manner. The object of the invention is achieved by providing a separate reserve energy storage.

The invention as to its construction so to its mode of operation, together with additional objects and advantages thereof, will be best understood from the following detailed description of preferred embodiments with reference to the accompanying drawings.

DESCRIPTION OF THE PREFERRED EMBODIMENT

Figure 1:
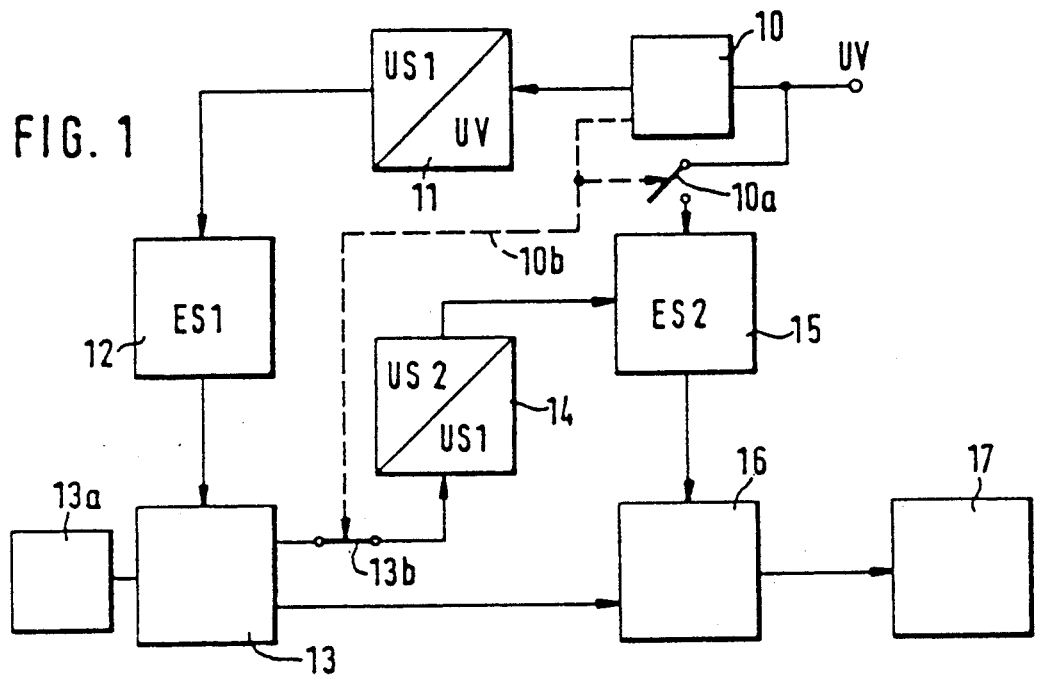
FIG. 1 shows a block diagram of the safety device according to the invention.

Retaining means provided for the protection of the vehicle passengers are designated with the reference number 17. The retaining means preferably consist of an air bag which is inflated by means of pyrotechnically produced gas in emergency situations and accordingly prevents, e.g., the head of the driver from impacting against the steering wheel. The retaining means 17 are actuated by a control circuit 16 comprising a power output stage. The control circuit 16 is in turn activated by a sensor circuit 13 which evaluates the signals from an impact sensor 13a. A piezoelectric pressure sensor is preferably used as an impact sensor. The entire safety device is connected to the in-vehicle voltage supply system and is supplied by the operating voltage UV in normal situations. In order to ensure the functioning of the safety device also during loss of the in-vehicle voltage supply system caused, for example, by the destruction of the line connections in the event of an accident, two separate reserve energy sources ES1 and ES2 are provided, wherein ES1 supplies the sensor evaluating circuit 13 and the sensor 13a with voltage, and ES2 supplies the control circuit 16 with voltage. The reserve energy storage is preferably charged to a voltage with a magnitude substantially below that of the operating voltage UV of the in-vehicle voltage supply system. If, for example, the supply voltage UV in motor vehicles is in the order of magnitude of approximately 10–16 Volts, the reserve energy storage ES1 is advisably charged to a voltage of approximately 6 Volts. For this purpose, a voltage transformer 11 which converts the voltage UV to the lower voltage US1 is connected between the reserve energy storage 12 and the supply voltage UV. At voltage levels of the in-vehicle voltage supply system lying within the normal range, that is, between approximately 10 and 16 Volts, the second reserve energy storage 15 (ES2) supplying the control circuit 16 with voltage is also directly connected with the supply voltage UV via a normally closed switch 10a and is charged to this voltage. In addition, a voltage comparison circuit (comparator 10), which constantly compares the level of the available supply voltage UV with a desired value which can be preset, is connected between the supply voltage UV and the voltage transformer 11. As soon as the actual supply voltage UV of the in-vehicle voltage supply system falls below this desired value, which can be preset, the second reserve energy storage 15 is from the supply voltage UV via a first switch 10a. A second switch 13b, which produces a connection between the sensor evaluating circuit 13 and a second voltage transformer 14, which latter converts the output voltage of the first reserve energy storage 12 available in 13 into the desired voltage US 2 of the second reserve energy storage 15 and, accordingly, charges the latter, is then closed by means of the actuating line 10b. In this way it is ensured that the second reserve energy storage 15 also remains charged with the desired voltage necessary for a reliable actuation of the safety device during a sharp drop in the supply voltage UV.

Figure 2:
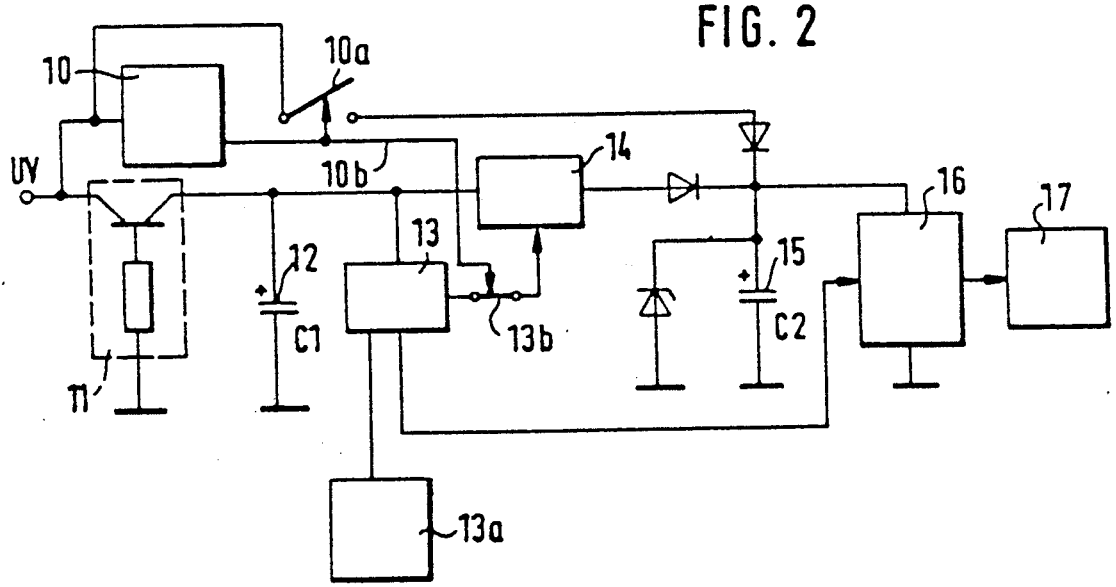
FIG. 2 shows a simplified diagram with a reserve energy storage.

In the simplified diagram according to FIG. 2, it can be seen that electrolytic capacitors C1 and C2, respectively, are used as reserve energy storages 12 and 15, respectively. The division into two separate energy storages provides the advantage that the dielectric strength of the electrolytic capacitors, which are used as energy storages and which participate in determining the dimensions of the capacitors to a decisive degree, can be exactly adapted to the requirements of the circuit arrangement. Accordingly, it is possible to maintain the operability of the safety device, which is required for a determined period of time, at a minimum cost in space, which in turn benefits the compactness of the safety device. In comparison to the reserve energy storage 15, which must be designed for an operating voltage of at least approximately 16 Volts, the reserve energy storage 12 need merely be designed for a dielectric strength of approximately 6 Volts. As a result, it has substantially smaller external dimensions.

While the invention has been illustrated and described as embodied in a safety device for car passengers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A safety device for an occupant of a vehicle having an in-vehicle voltage source, said safety device comprising retaining means; a sensor for sensing a vehicle condition; a sensor circuit for evaluating a sensor condition; a control circuit for actuating said retaining means in response to a predetermined sensor condition; first separate reserve energy storage means for supplying an electrical energy to said sensor and said sensor condition evalutating circuit; second separate reserve energy storage means for supplying an electrical energy to said control circuit; a first voltage transformer for connecting said first reserve energy storage means to the in-vehicle voltage source for charging said first reserve energy storage means to a voltage which is lower than that of the in-vehicle voltage source; second voltage transformer fed from said first reserve energy source means; and means for connecting said second reserve energy storage means to the in-vehicle voltage source as long as the in-vehicle voltage source is able to supply a predetermined voltage level, and for connecting said second reserve energy storage means to said second voltage transformer for receiving the predetermined voltage level therefrom, when the voltage level of the in-vehicle voltage source falls below the predetermined voltage level.

2. A safety device according to claim 1 wherein each of said first and second reserved energy storage means comprises a capacitor.

3. A safety device according to claim 1 wherein each of said first and second reserved energy storage means comprises an electrolytic capacitor.

4. A safety device according to claim 1 wherein said first reserve energy storage means comprises a first capacitor having a first dielectric strength and said second reserve energy storage means comprises a second capacitor having a second dielectric strength which is different from the first dielectric strength of said first capacitor.

* * * * *